(12) United States Patent
Naito et al.

(10) Patent No.: US 9,729,617 B2
(45) Date of Patent: Aug. 8, 2017

(54) INFORMATION MANAGEMENT DEVICE, SYSTEM, AND METHOD FOR MANAGEMENT OF STATES OF USE OF LICENSES IN UNITS OF ORGANIZATIONS

(71) Applicants: Hisashi Naito, Kanagawa (JP); Mitsuo Ando, Fukuoka (JP)

(72) Inventors: Hisashi Naito, Kanagawa (JP); Mitsuo Ando, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 149 days.

(21) Appl. No.: 14/437,224

(22) PCT Filed: Oct. 29, 2013

(86) PCT No.: PCT/JP2013/079806
§ 371 (c)(1),
(2) Date: Apr. 21, 2015

(87) PCT Pub. No.: WO2014/073499
PCT Pub. Date: May 15, 2014

(65) Prior Publication Data
US 2015/0281332 A1  Oct. 1, 2015

(30) Foreign Application Priority Data
Nov. 7, 2012 (JP) .................. 2012-245094
Oct. 24, 2013 (JP) .................. 2013-220765

(51) Int. Cl.
*G06F 21/10* (2013.01)
*H04L 29/08* (2006.01)
(Continued)

(52) U.S. Cl.
CPC ............ *H04L 67/10* (2013.01); *G06F 21/10* (2013.01); *G06F 21/105* (2013.01); *G06F 21/12* (2013.01);
(Continued)

(58) Field of Classification Search
CPC .... G06F 21/10; G06F 9/44584; G06F 21/105; G06F 21/12; G06F 21/121; G06Q 20/354;
(Continued)

(56) References Cited

U.S. PATENT DOCUMENTS 7,703,142 B1  4/2010 Wilson et al.
8,482,780 B2  7/2013 Uchiyama et al.
(Continued)

FOREIGN PATENT DOCUMENTS

JP  2004-303188  10/2004
JP  2008-217430  9/2008
(Continued)

OTHER PUBLICATIONS

Extended European Search Report dated Sep. 29, 2015.
International Search Report Issued on Feb. 4, 2014 in PCT/JP2013/079806 filed on Oct. 29, 2013.

*Primary Examiner* — Le H Luu
(74) *Attorney, Agent, or Firm* — IPUSA, PLLC

(57) ABSTRACT

An information management device includes a first receiving unit that receives organization identification information to identify an organization and device identification information to identify a device in the organization from the device, a first storage unit that stores the received organization identification information and the received device identification information which are associated together, a second receiving unit that receives license identification information and the device identification information from the device, the license identification information identifying a license for using a predetermined service, and a second storage unit that stores the received license identification information and the received device identification information which are associated together.

7 Claims, 13 Drawing Sheets

(51) Int. Cl.
  *G06F 21/12* (2013.01)
  *G06Q 30/06* (2012.01)
  *H04L 29/06* (2006.01)

(52) U.S. Cl.
  CPC ....... *G06F 21/121* (2013.01); *G06Q 30/0645* (2013.01); *H04L 67/40* (2013.01)

(58) Field of Classification Search
  CPC ....... G06Q 30/02; H04L 67/104; H04L 67/10; H04L 67/40; H04N 21/25816
  See application file for complete search history.

(56) References Cited

U.S. PATENT DOCUMENTS

| | | | |
|---|---|---|---|
| 2001/0013024 A1 | 8/2001 | Takahashi et al. | |
| 2011/0131134 A1 | 6/2011 | Ferris et al. | |
| 2011/0162062 A1 | 6/2011 | Kumar et al. | |
| 2012/0204269 A1* | 8/2012 | Gardner | G06F 21/10 726/26 |
| 2013/0073719 A1 | 3/2013 | Ando | |
| 2013/0174196 A1* | 7/2013 | Herlein | G06Q 30/02 725/35 |
| 2013/0174238 A1* | 7/2013 | Wang | H04N 21/25816 726/7 |
| 2013/0275973 A1* | 10/2013 | Greenfield | G06F 9/44584 718/1 |
| 2013/0304789 A1* | 11/2013 | Herlein | G06Q 30/02 709/201 |
| 2014/0058863 A1* | 2/2014 | Biswas | G06Q 20/354 705/21 |
| 2015/0200975 A1* | 7/2015 | Perez | H04L 67/104 709/204 |

FOREIGN PATENT DOCUMENTS

| | | |
|---|---|---|
| JP | 2010-191981 | 9/2010 |
| JP | 2011-096155 | 5/2011 |
| JP | 2011-257907 | 12/2011 |
| JP | 2012-113403 | 6/2012 |

* cited by examiner

FIG.7

| TENANT ID | REGION NAME | ADMINISTRATOR ID | PASSWORD |
|---|---|---|---|
| 123 | JAPAN | ID0001 | pwd0001 |
| 456 | ... | ID0002 | pwd0002 |

| LICENSE ID | TENANT ID | MACHINE SERIAL ID | LICENSE CLASSIFICATION | SERVICE TYPE | START DATE | END DATE | STATE OF USE |
|---|---|---|---|---|---|---|---|
| App1-001 | 123 | | STANDARD MODE | SERVER APPL.-A | | | INACTIVATION |
| App1-002 | 123 | GHI-JKL | SIMPLE MODE | SERVER APPL.-A | 2011/8/1 | 2012/7/31 | TERMINATION |
| App2-001 | 123 | ABC-DEF | STANDARD MODE | SERVER APPL.-B | 2012/4/1 | 2012/9/31 | ACTIVATION |
| App3-001 | 456 | MNO-PQR | ... | ... | ... | ... | ... |

| MACHINE SERIAL ID | TENANT ID | MACHINE NAME | MACHINE TYPE | INSTALLATION |
|---|---|---|---|---|
| ABC-DEF | 123 | AAA | A4 COLOR | XX OFFICE |
| GHI-JKL | 123 | BBB | A2 COLOR | YY OFFICE |
| MNO-PQR | 456 | CCC | A4 MONOCHROME | ZZ OFFICE |

TENANT NAME: ○○××    ADMINISTRATOR ID:ID0001
TENANT ID:123    PASSWORD:pwd0001 — 511

| MACHINE SERIAL ID | MACHINE NAME | MACHINE TYPE | INSTALL. PLACE | LICENSE ID | LICENSE CLASS. | SERVICE TYPE | START DATE | END DATE |
|---|---|---|---|---|---|---|---|---|
| ABC-DEF | AAA | A4 COLOR | XX OFFICE | App1-001 | STD MODE | SERVER APPL.-A | xxx | xxx |
| ABC-DEF | AAA | A4 COLOR | XX OFFICE | App2-001 | STD MODE | SERVER APPL.-B | 2012/4/1 | 2012/9/30 |
| GHI-JKL | BBB | A2 COLOR | YY OFFICE | App1-002 | SIMPLE MODE | SERVER APPL.-A | 2011/8/1 | 2012/7/31 |

TENANT NAME:○○××  ADMINISTRATOR ID: ID0001
TENANT ID:123  PASSWORD:pwd0001 — 511

510b

| MACHINE SERIAL ID | MACHINE NAME | MACHINE TYPE | INSTALL. PLACE | LICENSE ID | LICENSE CLASS. | SERVICE TYPE | START DATE | END DATE |
|---|---|---|---|---|---|---|---|---|
| ABC-DEF | AAA | A4 COLOR | XX OFFICE | App2-001 | STD MODE | SERVER APPL.-B | 2012/4/1 | 2012/9/30 |

512

OK

INFORMATION MANAGEMENT DEVICE, SYSTEM, AND METHOD FOR MANAGEMENT OF STATES OF USE OF LICENSES IN UNITS OF ORGANIZATIONS

TECHNICAL FIELD

The present disclosure relates to an information management device, an information management system, an information management method, and a recording medium.

BACKGROUND ART

Conventionally, a service provided through a network, such as a cloud service, can be utilized by various devices in the network. For example, see Japanese Laid-Open Patent Publication No. 2011-096155.

One of the advantages of a cloud service is that, even when different devices, are used by a user, the user is capable of making use of a service with secured consistency from the cloud service. For example, there is a case in which, after a cloud service is utilized by a user using a PC in a company office, the user accesses the cloud service by using a PC in his home. In this case, while the continuity from the state of use of the service when the service was accessed by the PC in the company office is maintained, the user can make use of the service from the cloud service.

In the meantime, there is also a case where it is desired to allow only a limited number of devices to make use of a service. Specifically, it is desired to allow provision of the service only when the service is accessed by a certain device. In this case, a conceivable method of identifying such a device that is allowed to access the service is to manage device information of the device associated with the service.

However, for example, management of states of use of services by companies or enterprises on an organization-by-organization basis is difficult to carry out only with the association of devices and services. This difficulty is a problem which is common for the services provided through networks, including cloud services, web services, and services provided by application service providers (ASPs).

SUMMARY

In one embodiment, the present disclosure provides an information management device which is capable of carrying out management of the states of use of services on an organization-by-organization basis.

In one embodiment, the present disclosure provides an information management device including a first receiving unit configured to receive organization identification information to identify an organization and device identification information to identify a device in the organization from the device; a first storage unit configured to store the received organization identification information and the received device identification information which are associated together; a second receiving unit configured to receive license identification information and the device identification information from the device, the license identification information identifying a license for using a predetermined service; and a second storage unit configured to store the received license identification information and the received device identification information which are associated together.

Other objects, features and advantages of embodiments will be apparent from the following detailed description when read in conjunction with the accompanying drawings.

BRIEF DESCRIPTION OF DRAWINGS

FIG. 7 is a diagram showing the configuration of a tenant information storage unit.

FIG. 8 is a diagram showing the configuration of a license information storage unit.

FIG. 10 is a diagram showing the configuration of a device information storage unit.

FIG. 12 is a diagram showing a first example of an output of a search result of license information.

FIG. 13 is a diagram showing a second example of an output of a search result of license information.

DESCRIPTION OF EMBODIMENTS

A description will be given of embodiments with reference to the accompanying drawings.

Figure 1:
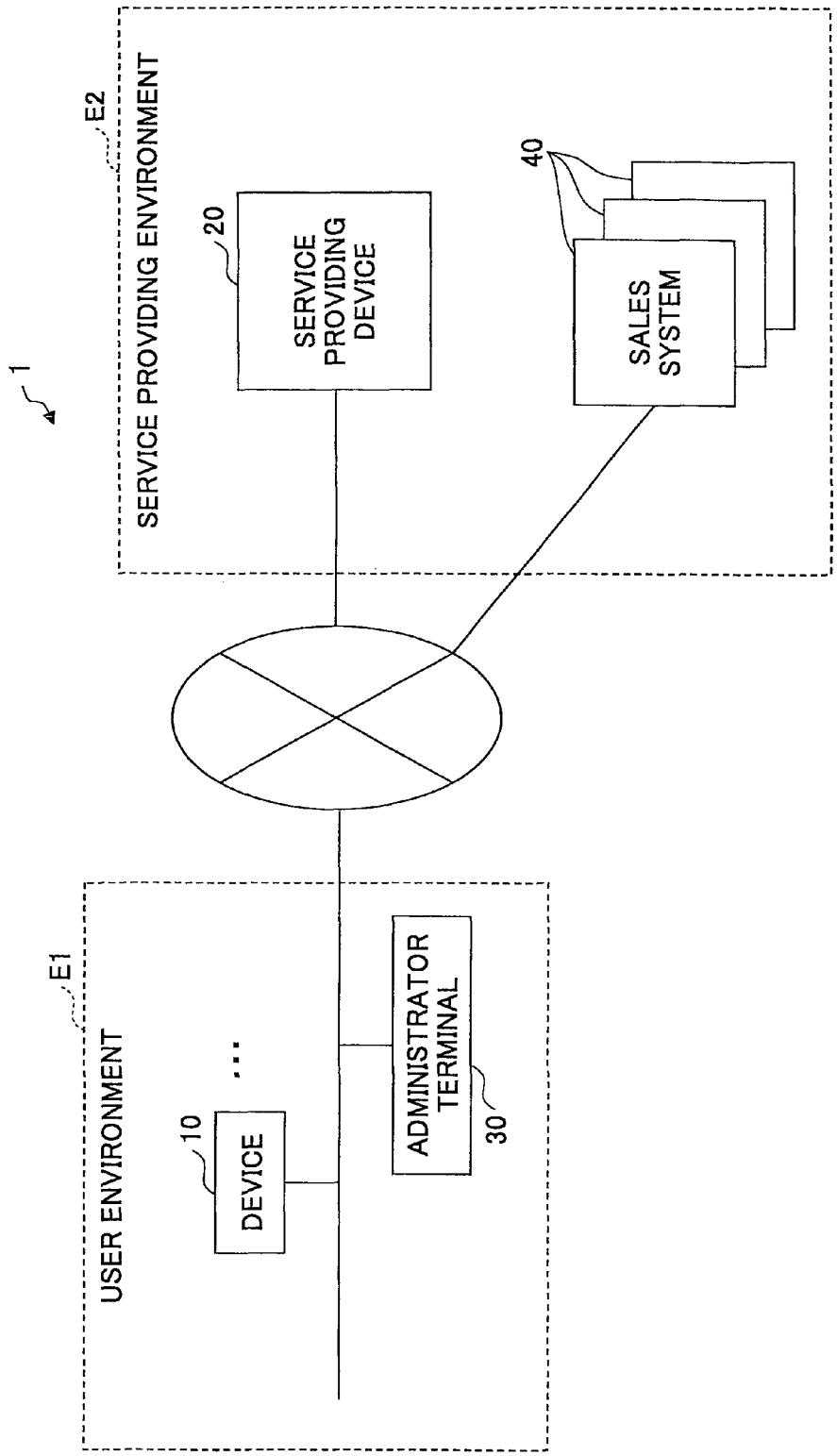
FIG. 1 is a diagram showing the configuration of an information management system according to an embodiment.

FIG. 1 is a diagram showing the configuration of an information management system 1 of an embodiment. In the information management system 1 shown in FIG. 1, a user environment E1 and a service providing environment E2 communicate with each other via a wide-area network, such as the Internet.

The service providing environment E2 is a system environment arranged in an organization that provides a cloud service via the network. In the following embodiment, the service providing environment E2 providing the cloud service is explained as an example. However, the service providing environment E2 may be arranged to provide a service via a network, such as a web service, or may be arranged to provide a service via a network by using an ASP (application service provider).

The service providing environment E2 includes a service providing device 20 and one or more sales systems 40. The service providing device 20 provides a predetermined service via the network. Specifically, the service providing device 20 provides a service which is associated with a device 10 in the user environment E1, via the network. The service associated with the device 10, provided by the service providing device 20, is implemented by using a function of the device 10. In the following, various services provided by the service providing device 20 will be collectively called "device association services".

In addition, the service providing device 20 manages licenses related to the device association services. A license related to the device association service represents the authorized right to use the device association service.

Alternatively, the service providing device 20 may be disposed in the user environment E1.

Each sales system 40 is implemented by one or more computers disposed in each of sales bases of the device association services. A sales base is arranged for each of sales regions of the device association services, and the license related to the device association service is sold to a user in the user environment E1 belonging to a sales region. The contents of the sold license are input to the sales system 40. For example, the sales regions are divided into the U.S., European countries, Japan, and Asian countries other than Japan.

The user environment E1 is a system environment arranged in an organization of a user company which owns the device 10. In the user environment E1, one or more devices 10 and an administrator terminal 30 are connected together via a network, such as LAN (local area network).

For example, the device 10 is an image forming device. However, as described later, an electronic device other than an image forming device may constitute the device 10.

The administrator terminal 30 is a terminal which is used by an administrator of the device 10 in the user environment E1. Examples of the administrator terminal 30 include a PC (personal computer), a PDA (personal digital assistant), a tablet type terminal, a smart phone, and a mobile phone.

Figure 2:
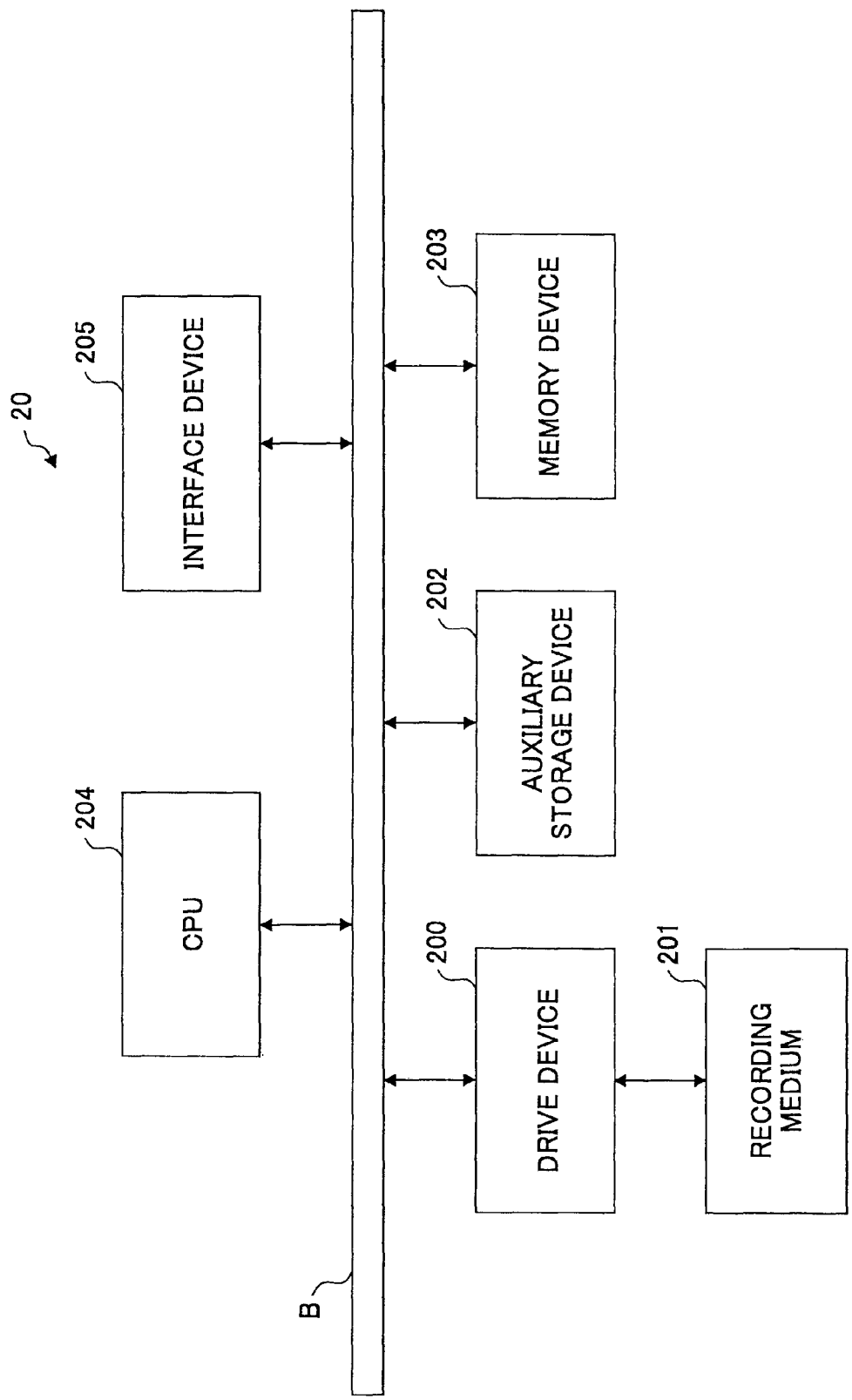
FIG. 2 is a diagram showing the hardware configuration of a service providing device in the information management system according to the embodiment.

FIG. 2 is a diagram showing the hardware configuration of the service providing device according to the embodiment. As shown in FIG. 2, the service providing device 20 includes a drive device 200, an auxiliary storage device 202, a memory device 203, a CPU 204, and an interface device 205, which are interconnected by a bus B.

A program for implementing the process performed by the service providing device 20 is supplied by a recording medium 201, such as CD-ROM. When the recording medium 201 in which the program is stored is set in the drive device 200, the program from the recording medium 201 is installed in the auxiliary storage device 202 through the drive device 200. However, the installation of the program from the recording medium 201 is not necessarily required. Alternatively, the program may be downloaded from another computer via the network. The auxiliary storage device 202 stores the installed program and also stores necessary files and data.

The memory device 203 reads the program from the auxiliary storage device 202 when a program start instruction is received, and stores the program. The functions related to the service providing device 20 are implemented by instructions received from the CPU 204 based on the program stored in the memory device 203. The interface device 205 is used as an interface for connecting the service providing device 20 with the network.

The service providing device 20 may be constituted by a plurality of computers, each having the hardware configuration as shown in FIG. 2. Namely, as described later, the processes performed by the service providing device 20 may be distributed to and performed by the plurality of computers.

Figure 3:
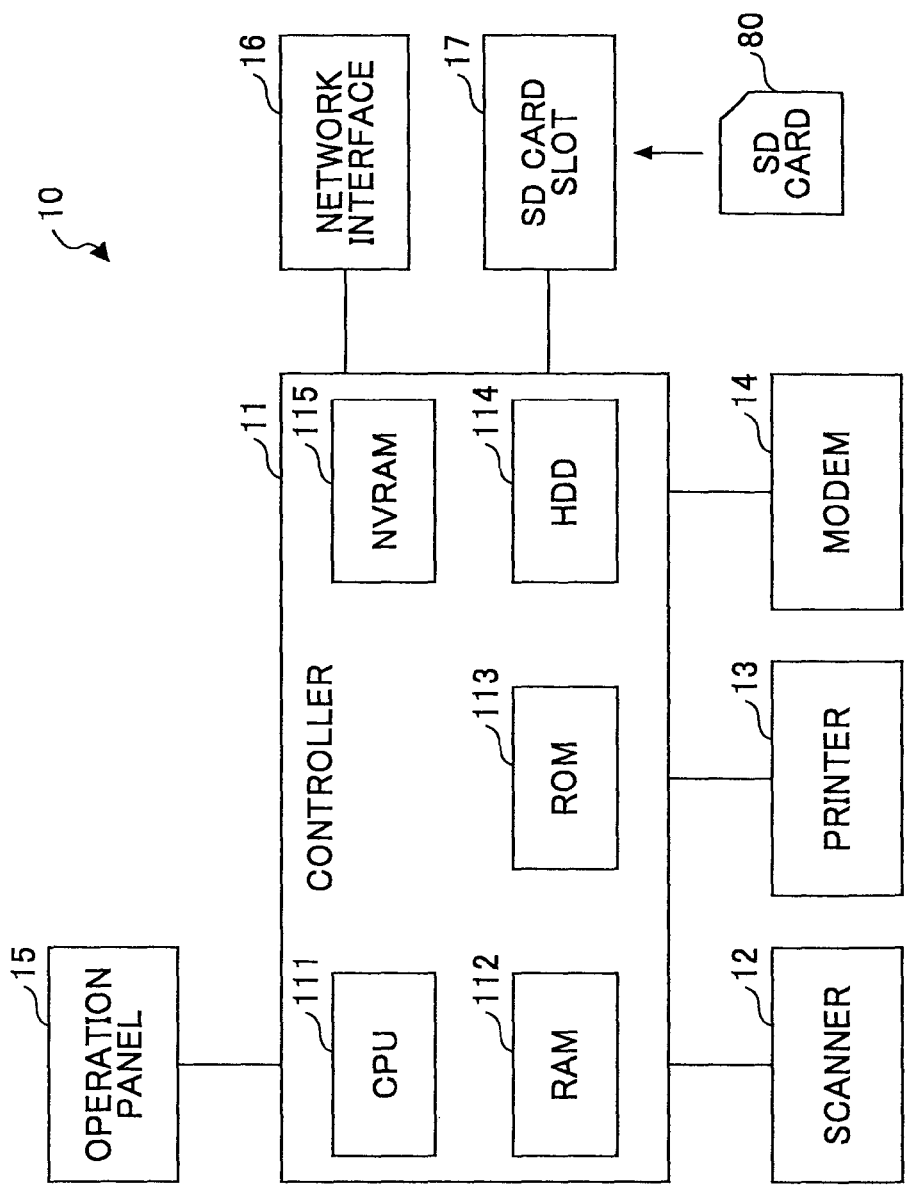
FIG. 3 is a diagram showing the hardware configuration of an image forming device which is an example of a device in the information management system according to the embodiment.

FIG. 3 is a diagram showing the hardware configuration of an image forming device which is an example of the device 10 in the information management system according to the embodiment. As shown in FIG. 3, the device 10 which is the image forming device includes a controller 11, a scanner 12, a printer 13, a modem 14, an operation panel 15, a network interface 16, and an SD card slot 17.

The controller 11 includes a CPU 111, a RAM 112, a ROM 113, a HDD 114, and a NVRAM 115. Various programs and data used by the programs are stored in the ROM 113. The RAM 112 is used to provide a storage area for loading a program and a work area of the loaded program. Various functions of the device 10 are implemented by instructions received from the CPU 111 when the program loaded on the RAM 112 is executed by the CPU 111. Various programs and data used by the programs are stored in the HDD 114. Various kinds of setting information are stored in the NVRAM 115.

The scanner 12 is an image reading unit for reading image data from a document. The printer 13 is a printing unit for printing print data on a print sheet. The modem 14 is a hardware unit for connecting the device 10 with a telephone line, and the modem 14 is used to transmit image data to and receive image data from an external device through FAX communication. The operation panel 15 includes a display unit such as a liquid crystal panel, and an input unit including buttons for receiving inputs from a user. The liquid crystal panel may have a touch-panel function. In such a case, the liquid crystal panel functions as the input unit and the display unit. The network interface 16 is a hardware unit for connecting the device 10 with the network, such as LAN. The network may be either a cable network or a radio network. The SD card slot 17 is used to read the program stored in an SD card 80. Namely, in the device 10, not only the program stored in the ROM 113 but also the program stored in the SD card 80 is loaded into the RAM 112 and executed by the CPU 111. The SD card 80 may be replaced by another recording medium, such as a CD-ROM or a USB (universal serial bus) memory. Namely, the kind of the recording medium equivalent to the SD card 80 is not limited. In such a case, the SD card slot 17 may be replaced by a hardware unit according to the recording medium used.

Figure 4:
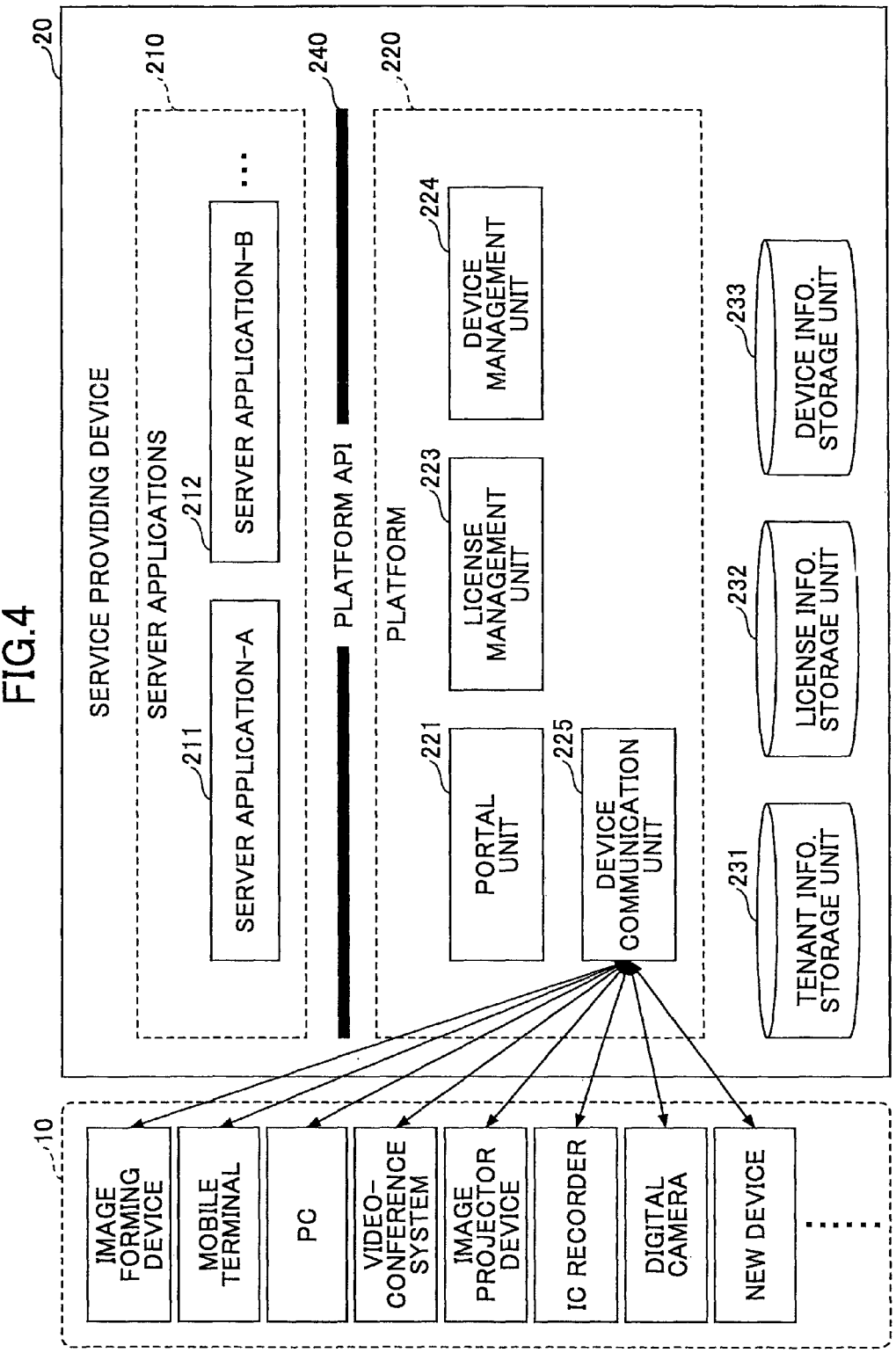
FIG. 4 is a diagram showing the functional configuration of the service providing device in the information management system according to the embodiment.

FIG. 4 is a diagram showing the functional configuration of a service providing device 20 according to the embodiment. As shown in FIG. 4, the service providing device 20 includes server applications 210 and a platform 220. These units are implemented by the processes performed by the CPU 204 based on the one or more programs installed in the service providing device 20.

Further, the service providing device 20 includes a tenant information storage unit 231, a license information storage unit 232, and a device information storage unit 233, which are used by the processes performed by the CPU 204 based on the one or more programs installed in the service providing device 20. These storage units are implemented by the auxiliary storage device 202 or an external storage device connected to the service providing device 20 via the network.

The server applications 210 include application programs provided on the side of a server (cloud) for implementing the device association services. One of the server applications 210 is provided to implement a corresponding one of the device association services (one service). In the embodiment of FIG. 4, a server application-A 211 and a server application-B 212 are illustrated as examples of the server applications 210. In this embodiment, the functions of the server application-A 211 and the server application-B 212 are not limited to specific functions. For example, the server application-A 211 may be provided to implement a function to distribute image data obtained by scanning a document on the device 10 to an online storage device which is set up beforehand as its image data distribution destination.

The platform 220 includes functions which are shared by the server applications 210 or basic functions which are utilized by the server applications 210. In the embodiment of FIG. 4, the platform 220 includes a portal unit 221, a license management unit 223, a device management unit 224, and a device communication unit 225. The functions of these units of the platform 220 are made public for the server applications 210 through a platform API (application programming interface) 240. In other words, the server applications 210 are capable of utilizing the functions of these platform units in the range currently made public through the platform API 240.

The portal unit 221 is configured to provide a portal site of the service providing device 20. The license management unit 223 is configured to perform a license management process for managing the licenses of the device association services. There is a one-to-one correspondence between the server applications 210 and the device association services. Hence, the licenses of the device association services are equivalent to the licenses of the server applications 210 associated with the device association services, respectively. The device management unit 224 is configured to perform a process for managing the device information stored in the device information storage unit 233. The device communication unit 225 is configured to communicate with the device 10.

In the embodiment of FIG. 4, in addition to the above-described image forming device, a mobile terminal, a PC, a videoconference system, an image projector device, an IC recorder, a digital camera, and a new device are illustrated as examples of the device 10.

The tenant information storage unit 231 is configured to store tenant information related to tenants. In this embodiment, a "tenant" represents an organization which has purchased a license of the device association service. For example, a company may be a "tenant". Alternatively, one of a plurality of departments constituting a company may be a "tenant". Namely, two or more tenants may exist in one company. In this embodiment, one user environment E1 may represent a "tenant". In any case, a "tenant" is a set of one or more individual users who actually use the device association services. An "organization" may not be related to a company but may be an arbitrary group or circle. In addition, an "organization" may be constituted by a single person.

The license information storage unit 232 is configured to store license information related to the licenses of the device association services used by tenants. The device information storage unit 233 is configured to store device information related to the device 10 in each tenant.

The configuration of the functional units (software) and the storage units in the service providing device 20 shown in FIG. 4 is a typical example. In order to implement the embodiment, it is not indispensable to arrange the hierarchal relationship of the functional units and the storage units in the service providing device 20 shown in FIG. 4. Namely, if the device 10 is provided to associate with the server applications 210, the hierarchical relationship of the functional units and the storage units in the service providing device 20 may not be limited to a specific relationship.

Figure 5:
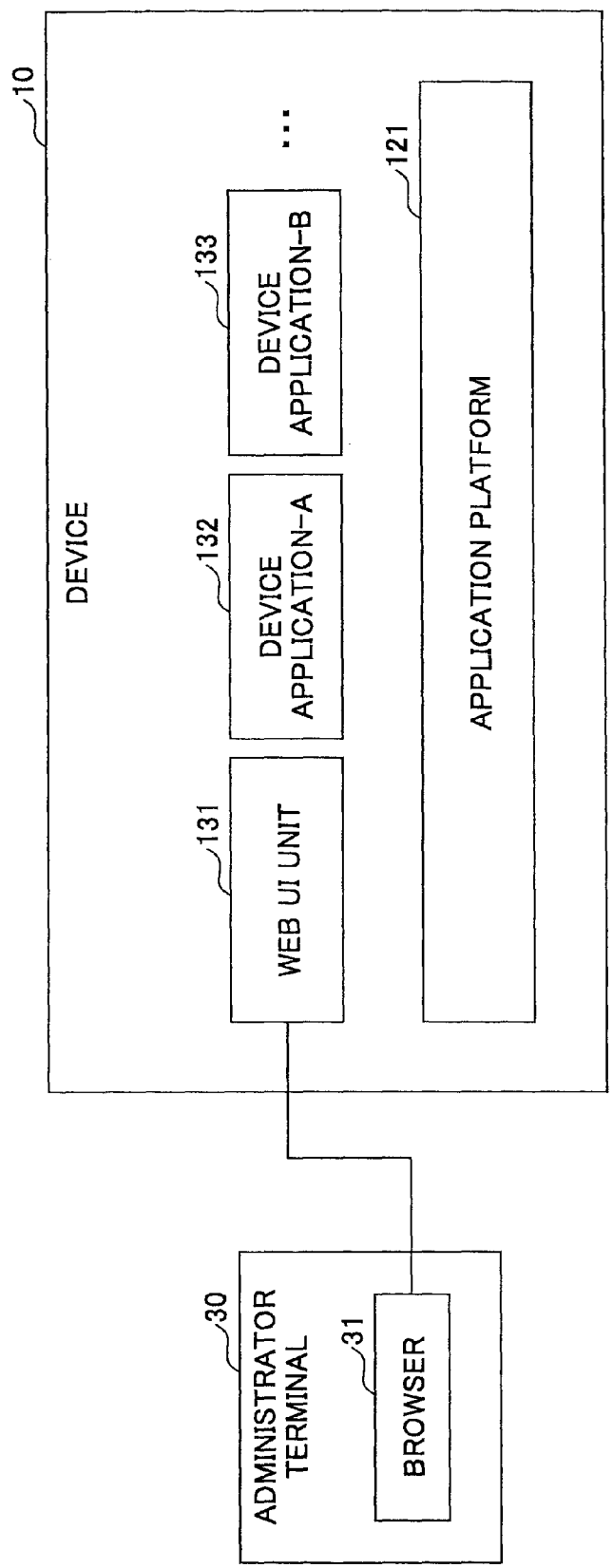
FIG. 5 is a diagram showing the functional configuration of the device in the information management system according to the embodiment.

FIG. 5 is a diagram showing the functional configuration of a device 10 according to the embodiment. As shown in FIG. 5, the device 10 includes a web UI unit 131, a device application-A 132, a device application-B 133, and an application platform 121. These functional units in the device 10 are implemented by instructions from the CPU 111 based on one or more programs installed in the device 10.

The web UI unit 131 is configured to provide a user interface related to a web page via the network. In this embodiment, the web UI unit 131 is configured to provide a user interface related to a web page to the administrator terminal 30.

The device application-A 132 and the device application-B 133 are examples of the application programs installed in the device 10 to implement the device association services. For example, the device application-A 132 pairs up with the server application-A 211 and carries out a device association service by association with the server application-A 211. For example, the device application-A 132 may be configured to cause the device 10 to perform scanning of a document and transmit image data from the scanned document to the server application-A 211. For example, the device application-B 133 pairs up with the server application-B 212 and carries out a device association service by association with the server application-B 212.

The application platform 121 provides an execution environment of the web UI unit 131, the device application-A 132 and the device application-B 133.

In the embodiment of FIG. 5, the administrator terminal 30 includes a browser unit 31. For example, the browser unit 31 is implemented by a process performed by a CPU of the administrator terminal 30 based on a web browser program installed in the administrator terminal 30. Namely, the browser unit 31 is configured to perform displaying of a web page received from the web UI unit 131 and perform other processes in response to the inputs to the web page displayed.

Figure 6:
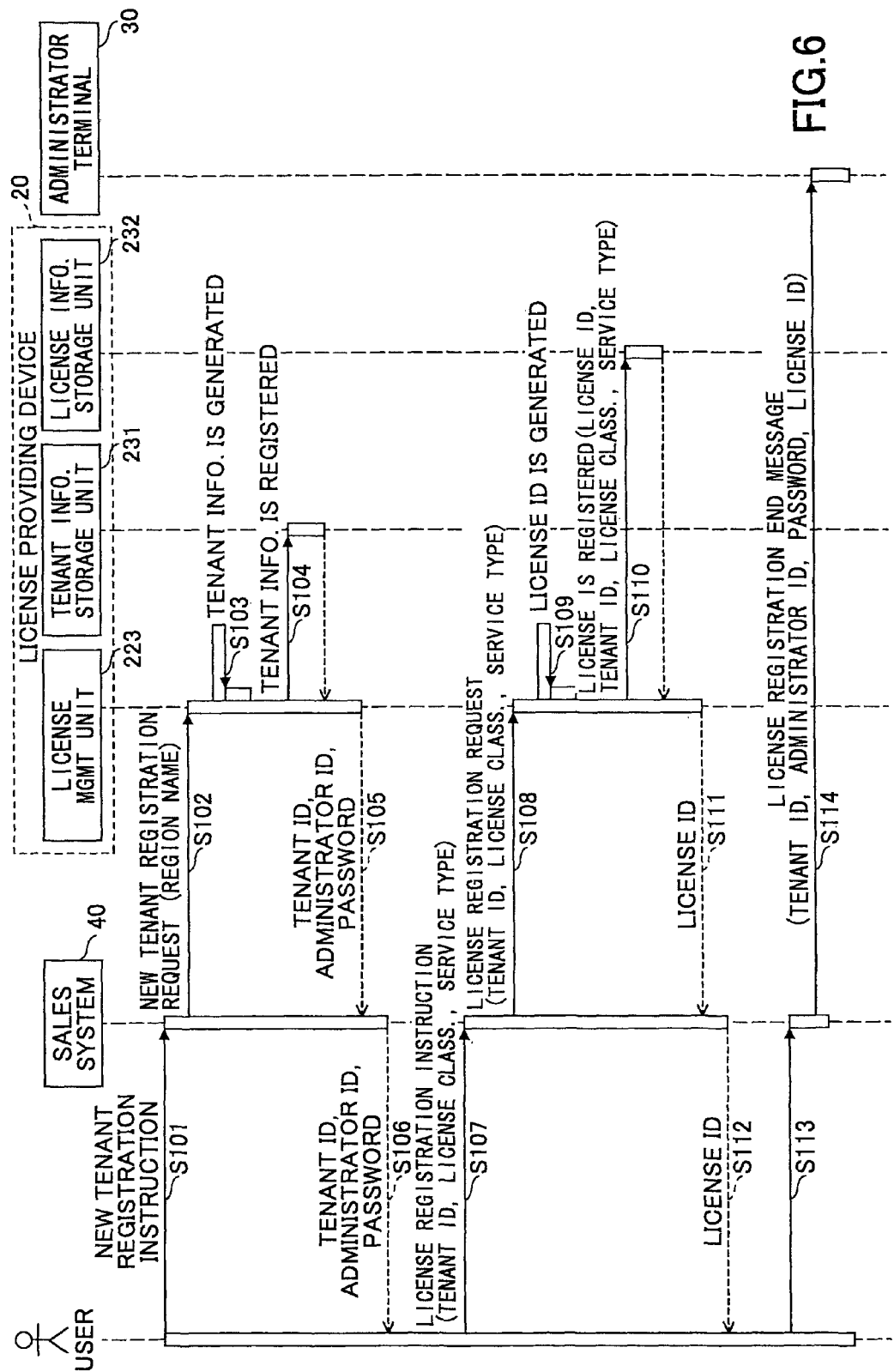
FIG. 6 is a sequence diagram for explaining a process performed by the information management system according to the embodiment when a license of a device association service is purchased.

Next, processes performed by the information management system 1 will be described. FIG. 6 is a sequence diagram for explaining a process performed by the information management system 1 when a license of a device association service is purchased. It is assumed in the process of FIG. 6 that a license of a device association service is purchased by a user environment E1 belonging to a sales region which a certain sales base takes charge of. In FIG. 6, a process for registering information related to the purchased license in the service providing device 20 is performed according to an instruction input to the sales system 40 by a user, in charge of the sales base. In the following, the user environment E1 which has purchased the license is called "target user".

If the target user is a new tenant, a process for the registration of the target user as a tenant (S101-S106) is performed with respect to the target user. The "new tenant" represents a first user who has purchased the license of the device association service. Hence, if a user environment which purchased a license of one device association service and was already registered as a tenant has further purchased a license of another device association service, it is not necessary to perform the procedure of steps S101-S106 in FIG. 6 for the user environment.

First, in the process of FIG. 6, at step S101, the user inputs a new tenant registration instruction to the sales system 40.

In response to the instruction, the sales system 40 transmits a new tenant registration request to the license management unit 223 of the service providing device 20 (S102). For example, the registration request contains a specified region name of the sales region which the sales system 40 belongs to. In response to the registration request, the license management unit 223 generates tenant information related to the new tenant (S103). The contents of the tenant information will be described later.

Subsequently, the license management unit 223 registers a record of the tenant information of the new tenant in the tenant information storage unit 231 (S104).

FIG. 7 is a diagram showing the configuration of the tenant information storage unit 231. As shown in FIG. 7, the tenant information storage unit 231 stores tenant information of each of the tenants registered. For example, a record of the tenant information includes a tenant ID, a region name, an administrator ID, and a password.

The tenant ID is identification information to identify each tenant. The region name is a region name of a sales region which the tenant belongs to. The administrator ID is identification information to identify an administrator in the tenant. The password is a password of the administrator. The administrator represents a user of the administrator terminal 30 in this embodiment. What kind of position the administrator has in the user environment E1 is not limited. The administrator may not be a specific individual. Use of the same administrator ID and password may be permitted by two or more persons.

At step S104, the new record of the tenant information is added to the tenant information storage unit 231, and the values of the respective items are stored in the new record. Regarding the tenant ID, the administrator ID and the password, the values of these items generated by the license management unit 223 at step S103 are registered. Regarding the region name, the value of this item received from the sales system 40 is registered. However, the administrator ID and the password may be specified by the target user at the time of sale of the license. In this case, the administrator ID and the password may be input to the sales system 40 by the user at step S101.

Subsequently, the license management unit 223 sends back to the sales system 40 the tenant ID related to the new tenant (target user), the administrator ID, and the password (S105). Then, the sales system 40 outputs the tenant ID, the administrator ID, and the password which are received from the service providing device 20 (S106). The outputting of these items by the sales system 40 at step S106 may be, for example, displaying the items on a display device or printing the items by a printer.

Subsequently, the user inputs an instruction of registration of information related to the purchased license ("new license") to the sales system 40 (S107). Together with this registration instruction, a tenant ID of the target user, a license classification, a service type, etc., are input to the sales system 40. The license classification is a classification of a range of an authorized utilization right. For example, the license classification is determined depending on the range of available functions permitted to be used by the target user. The charge amount is determined depending on the license classification.

The service type is a type of the device association service which is the object of the license. The license classification and the service type may be selected according to the target user's intention at a time of purchase of the new license.

Subsequently, the sales system 40 transmits a new-license registration request to the license management unit 223 (S108). This registration request contains the tenant ID, the license classification, and the service type. In response to the registration request, the license management unit 223 generates a license ID of the license related to the registration request (S109). A license ID is identification the information to identify each license. Subsequently, the license management unit 223 registers a record of license information related to the new license in the license information storage unit 232 (S110).

FIG. 8 is a diagram showing the configuration of the license information storage unit 232. As shown in FIG. 8, the license information storage unit 232 stores records of license information, each record including a license ID, a tenant ID, a machine serial ID, a license classification, a service type, a start date, an end date, a state, etc., for each license.

The license ID is identification information to identify the license. The tenant ID is identification information to identify the tenant to which the license is given. The machine serial ID is identification information to identify the device 10 which is to be associated with the device association service related to the license. Examples of the machine serial ID may include a serial number, a MAC address, and an IP address of the device 10. The license classification is a classification of the license. The service type is a service type of the device association service related to the license. In this embodiment, a name of the server application 210 is used as a value of the service type. The start date is a start date of use of the license. The end date is an end date of use of the license. The use of a license represents using the device association service in the user environment E1 based on the license. The state is a state of the license. In this embodiment, the state of a license may be one of "termination", "inactivation" and "activation". The state "inactivation" is a state in which the use of the license is not started. The state "activation" is a state in which the use of the license is already started. The state "termination is a state in which the use of the license is terminated, i.e., a state in which the license is invalid.

Referring back to FIG. 6, at step S110, the new record of license information is added to the license information storage unit 232, and the values of the license ID, the tenant ID, the license classification, the service type, and the state are stored in the new record. For example, a first record in the license information storage unit 232 shown in FIG. 8 corresponds to the new record which is registered at step S110. The value of the license ID generated at step S109 is stored in the license ID of the first record. The values of the tenant ID, the license classification and the service type received from the sales system 40 are stored in the tenant ID, the license classification and the service type of the first record, respectively. The value "inactivation" of the state is stored in the state of the first record.

Subsequently, the license management unit 223 sends back to the sales system 40 the license ID of the new license (S111). In response, the sales system 40 outputs the received license ID (S112). The outputting of this item by the sales system 40 may be displaying the item on the display device or printing the item by the printer.

Subsequently, in response to an instruction input by the user (S113), the sales system 40 transmits a license registration end message to the administrator terminal 30 of the target user (S114). For example, the license registration end message contains the tenant ID, the administrator ID, the password, and the license ID of the new license. However, when the target user is not a new user, it is not necessary to report the tenant ID, the administrator ID and the password to the administrator terminal 30. For example, the transmission of the license registration end message may be performed by e-mail. In this case, an e-mail address of a destination terminal of the message may be received from the target user at the time of sale of the license.

Alternatively, in the process of FIG. 6, the transmission at step S114 may be automatically performed by the sales system 40 following the reception of the license ID at step S111.

Next, a process performed by the information management system 1 when the administrator who received the license registration end message performs an operation for starting use of the license in the user environment E1 will be described.

Figure 9:
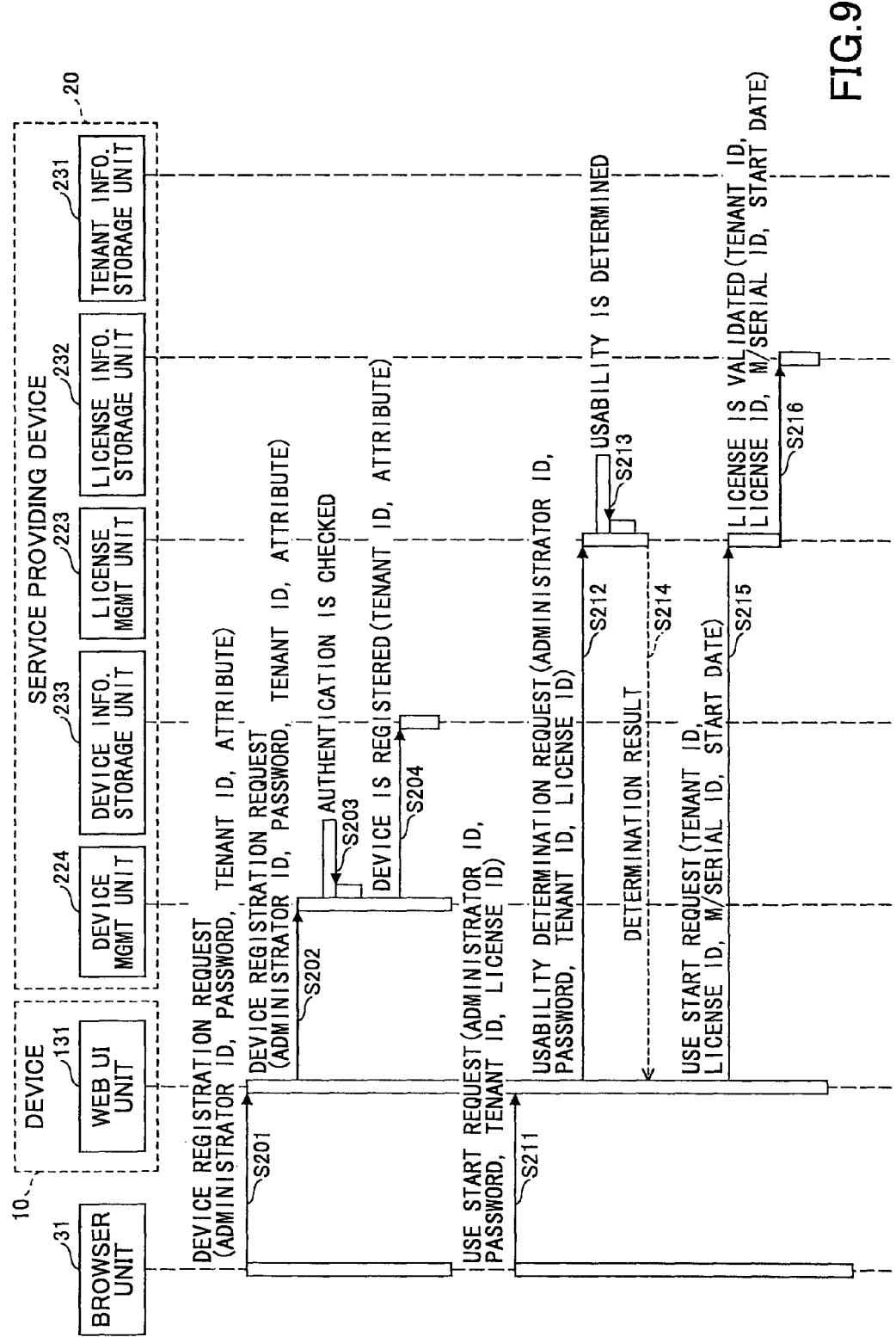
FIG. 9 is a sequence diagram for explaining a process performed by the information management system according to the embodiment when use of a license is started.

FIG. 9 is a sequence diagram for explaining a process performed by the information management system 1 when use of the license is started. It is assumed that a device registration screen is displayed on the administrator terminal 30 at a time of the start of the process of FIG. 9. For example, based on a web page received from the web UI unit 131, the device registration screen is displayed on the administrator terminal 30 by the browser unit 31. Strictly speaking, in the process of FIG. 9, the information transmitted from the device 10 (the web UI unit 131) is received by the device communication unit 225 and the device communication unit 225 transmits the received information to the device management unit 224 or the license management unit 223. However, in the following, the relaying of the information by the device communication unit 225 will be omitted for the sake of illustration.

After the administrator ID, the password, the tenant ID, and attribute information of the device 10 for registration are input by the administrator through the device registration screen, the browser unit 31 transmits a device registration request containing the above-described input information to the web UI unit 131 (S201).

Subsequently, the web UI unit 131 transmits the device registration request to the device management unit 224 (S202). At this time, the web UI unit 131 acquires a machine serial ID from the device 10 and includes the machine serial ID in the attribute information. Namely, the attribute information input by the administrator may be the attribute information which is not stored in the device 10.

Subsequently, the device management unit 224 checks the authenticity of the received device registration request (S203). Specifically, the device management unit 224 determines whether a record including the administrator ID, the password, and the tenant ID contained in the device registration request is stored in the tenant information storage unit 231. When the record including the administrator ID, the password, and the tenant ID contained in the request is not stored in the tenant information storage unit 231, processing of subsequent steps is stopped. On the other hand, when the record including the administrator ID, the password, and the tenant ID contained in the request is stored in the tenant information storage unit 231, the device management unit 224 associates the tenant ID contained in the device registration request with the attribute information contained therein, and registers the tenant ID and the attribute information in the device information storage unit 233 along with the association thereof (S204).

FIG. 10 is a diagram showing the configuration of the device information storage unit 233. As shown in FIG. 10, the device information storage unit 233 stores device information of each of the registered devices 10. Foe example, each record of the device information includes a machine serial ID, a tenant ID, a machine name, a machine type, and an installation place. In the device information storage unit 233, the association of each device 10 with its organization is stored. The machine serial ID, the machine name, the machine type, and the installation place are examples of the attribute information of the device 10. The machine name is a name of a machine or a model of the device 10. The machine type is information briefly indicating the function of the machine or the model of the device 10. The installation place is information indicating a place where the device 10 is arranged in the user environment E1. For example, if a managing organization of the service providing environment E2 is a manufacturer company of the device 10, it is conceivable that a database storing the machine name and the machine type associated with the machine serial ID is constructed. When such a database is constructed, it is not necessary for the administrator to input the machine name and the machine type directly, and the machine name and the machine type may be acquired from the database by using the machine serial ID as a search key.

In a case in which two or more devices 10 which are to be used with the device association services exist in the user environment E1, the procedure of steps S201-S204 may be performed collectively for the devices 10 or may be performed individually for each of the devices 10.

After the procedure of steps S201-S204 is performed for at least one of the devices 10, the use of the purchased license (or the new license in the process of FIG. 6) in the user environment E1 is permitted. In this case, the following step S211 is performed. It is assumed that a license use start screen is displayed on the administrator terminal 30 at a start of step S211. For example, the license use start screen may be displayed on the administrator terminal 30 by the browser unit 31 based on the web page received from the web UI unit 131.

After the administrator ID, the password, the tenant ID, and the license ID are input by the administrator through the license use start screen, the browser unit 31 transmits a license use start request containing the above-described input information to the web UI unit 131 (S211).

The web UI unit 131 transmits, to the license management unit 223, a license usability determination request containing the administrator ID, the password, the tenant ID, and the license ID contained in the received license use start request (S212). By this license usability determination request, the license management unit 223 is requested to determine the usability of the license regarding the license ID.

Subsequently, the license management unit 223 determines the usability of the license regarding the license ID (S213). For example, when the conditions that a record including the license ID and the tenant ID in the received license usability determination request is stored in the license information storage unit 232 and a value of the "state" item of the record in the license information storage unit 232 is "inactivation" are satisfied, it is determined that the license is usable or valid. On the other hand, when at least one of the conditions is not satisfied, it is determined that the license is not usable or invalid.

Alternatively, in a case in which the procedure of steps S211-S213 is performed asynchronously with the procedure of steps S201-S204, the condition as to whether a record including the administrator ID, the password and the tenant ID in the received license usability determination request is stored in the tenant information storage unit 231 may also be included as one of the conditions for determining the usability of the license.

Subsequently, the license management unit 223 sends back to the web UI unit 131 a determination result (S214).

When the determination result indicates that the use of the license is not permitted, processing of subsequent steps is stopped. On the other hand, when the determination result indicates that the use of the license is permitted, the web UI unit 131 transmits, to the license management unit 223, a license use start request containing the tenant ID, the license ID, the machine serial ID, and a start date (S215). In this connection, the machine serial ID is acquired from the device 10 by the web UI unit 131. Regarding the start date, the actual start date of the use of the license may be automatically selected by the license management unit 223, or a specific date may be input as the start date by the administrator through the license use start screen.

Subsequently, the license management unit 223 performs a process for validating the license regarding the license ID contained in the received license use start request (S216). Specifically, the license management unit 223 stores the machine serial ID from the received request into the record (including the tenant ID and the license ID from the received request) in the license information storage unit 232. Moreover, the license management unit 223 updates the value of the "state" item of the record to "activation". Further, the license management unit 223 stores respective values into the "start date" and "end date" items of the record in the license information storage unit 232. The start date from the received license use start request may be stored into the "start date" item of the record in the license information storage unit 232. For example, a date followed by a predetermined period after the start date may be stored into the "end date" item of the record.

Thereafter, a request for using the device association service with the machine serial ID and the license ID specified therein may be received at the surface providing device 20 from the device application-A 132 or the device application-B 133 of the device 10. In such a case, if a value of the "state" item of the record regarding the license ID from the received request is "activation" and the machine serial ID from the received request matches the machine serial ID of the record stored in the license information storage unit 232, the license management unit 223 permits the use of the license. Namely, the use of the license is permitted at step S216 in the process of FIG. 9.

Next, a process performed by the information management system 1 according to the embodiment when management information which is managed by using the tenant information storage unit 231, the license information storage unit 232 and the device information storage unit 233 is utilized will be described.

Figure 11:
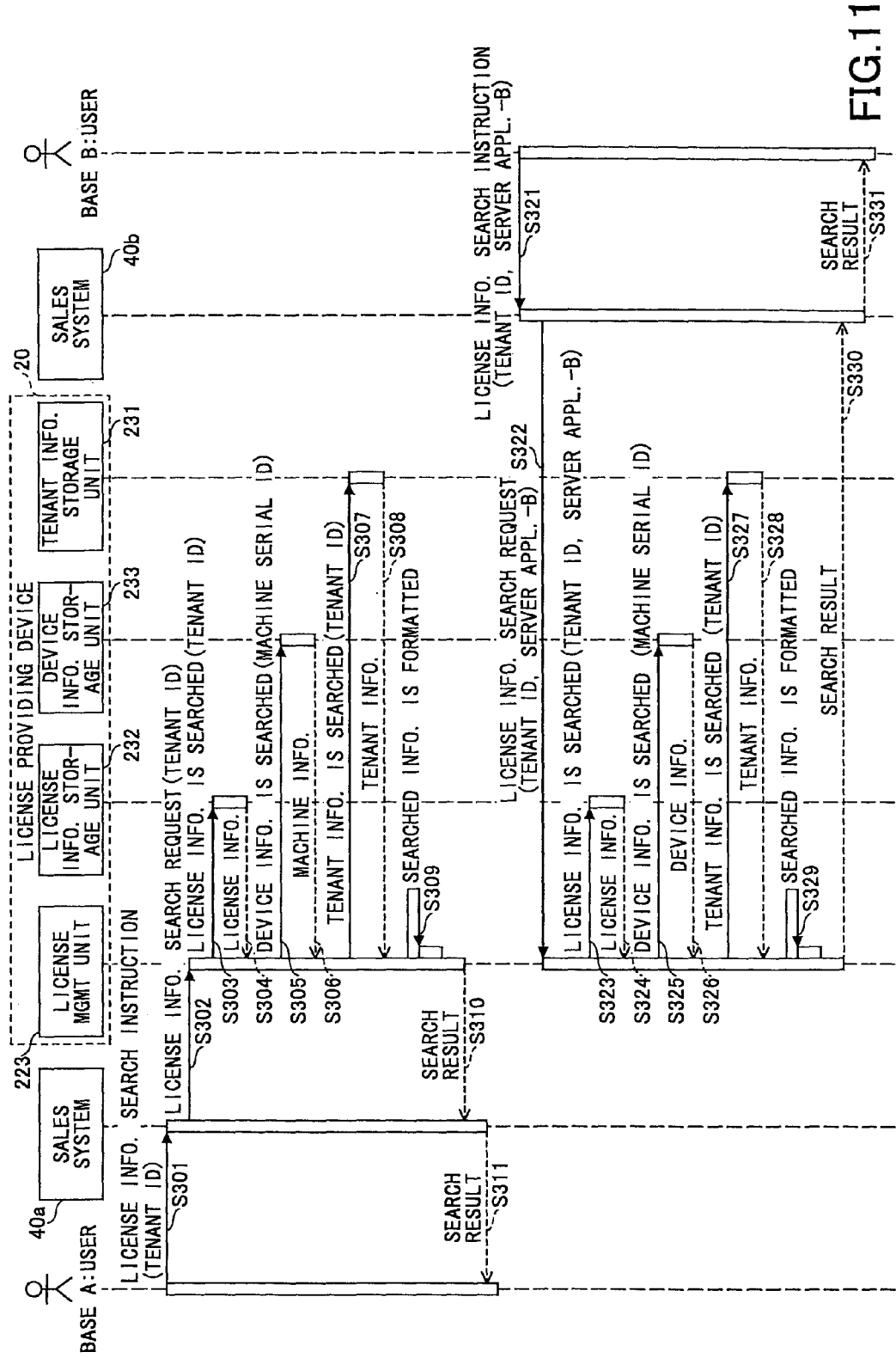
FIG. 11 is a sequence diagram for explaining a process performed by the information management system according to the embodiment when management information is utilized.

FIG. 11 is a sequence diagram for explaining a process performed by the information management system 1 according to the embodiment when the management information is utilized.

First, a case in which a user of a sales base ("base A") desires to check the license information related to a specific tenant ("target tenant") will be considered.

In this case, the user specifies a tenant ID of the target tenant and inputs a license information search instruction to the sales system 40*a* of the sales base A (S301). The sales system 40*a* transmits a license information search request containing the tenant ID to the license management unit 223 of the service providing device 20 (S302). In this connection, when the information associated with the tenant ID, such as a tenant name (or a company name) is managed in the sales system 40*a*, the user may input the tenant name at step S301 instead of the tenant ID. In such a case, the sales system 40*a* may transmit a license information search request containing the tenant ID associated with the input tenant name, to the license management unit 223.

The license management unit 223 searches for a record of the license information, including the tenant ID from the received request, in the license information storage unit 232 (S303, S304). Subsequently, the license management unit 223 searches for a record of the device information, including the machine serial ID from the obtained license information record, in the device information storage unit 233 (S305, S306). When there are two or more license information records obtained at step S304, the searching for the device information record is repeated for each of the license information records.

Subsequently, the license management unit 223 searches for a record of the tenant information, including the tenant ID, in the tenant information storage unit 231 (S307, S308).

Subsequently, the license management unit 223 formats the information obtained at steps S303-S308 and sets the formatted information as the search result of the license information (S309). For example, with respect to each license information record, the device information record including the machine serial ID contained in the license information record is associated with the license information record.

Subsequently, the license management unit 223 sends back to the sales system 40*a* the search result of the license information (S310). The sales system 40*a* outputs the search result of the license information (S311).

FIG. 12 is a diagram showing a first example of the output of the search result of the license information. As shown in FIG. 12, a license information display screen 510*a* is a screen in which the search result of the license information is displayed. The license information display screen 510*a* includes a tenant information displaying portion 511 and a license information viewing portion 512.

The tenant information record obtained at steps S307 and S308 is displayed in the tenant information displaying portion 511. The license information records obtained at steps S303 and S304 are associated with the device information records obtained at steps S305 and S306 and displayed in the license information viewing portion 512.

Accordingly, the user is able to easily check the license information related to the specific tenant by referring to the license information display screen 510*a*.

Next, a case in which a user of a sales base ("base B") desires to check a list of licenses related to a specific service type (for example, "server application-B 212") with respect to a specific tenant ("target tenant") will be considered.

In this case, the user specifies a tenant ID of the target tenant and the "server application-B" as the service type, and inputs a license information search instruction to the sales system 40*b* of the sales base B (S321). The sales system 40*b* transmits a license information search request containing the tenant ID and the service type to the license management unit 223 of the service providing device 20 (S322). In this connection, when the information associated with the tenant ID, such as a tenant name (or a company name), is managed in the sales system 40*b*, the user may input the tenant name at step S321 instead of the tenant ID.

The license management unit 223 searches for a record of the license information, including both the tenant ID and the service type from the received request, in the license information storage unit 232 (S323, S324). Subsequently, the license management unit 223 searches for a record of the device information, including the machine serial ID from the obtained license information record, in the device information storage unit 233 (S325, S326). When there are two or more license information records obtained at step S324, the searching for the device information record is repeated for each of the license information records.

Subsequently, the license management unit 223 searches for a record of the tenant information, including the tenant ID, in the tenant information storage unit 231 (S327, S328).

Subsequently, the license management unit 223 formats the information obtained at steps S323-S328 and sets the formatted information as the search result of the license information (S329). For example, with respect to each license information record, the device information record including the machine serial ID contained in the license information record is associated with the license information record.

Subsequently, the license management unit 223 sends back to the sales system 40b the search result of the license information (S330). The sales system 40b outputs the search result of the license information (S331).

FIG. 13 is a diagram showing a second example of the output of the search result of the license information. In FIG. 13, the elements which are essentially the same as corresponding elements in FIG. 12 are designated by the same reference numerals and descriptions thereof will be omitted.

As shown in FIG. 13, a license information display screen 510b is a screen in which the search result of the license information is displayed. The user is able to easily check the license information related to the specific tenant and the specific service type by referring to the license information display screen 510b.

As described above, according to the embodiment, the tenant ID is assigned for each organization and the license ID and the tenant ID that are associated with each other are managed. Therefore, the management of the states of use of the services (licenses) on an organization-by-organization basis can be carried out. As a result, the contents of services (licenses) on an organization-by-organization basis can be easily distinguished and the states of use of the services (licenses) on an organization-by-organization basis can be checked. For example, the management of charge amounts according to the use of the respective services on an organization-by-organization basis can be easily carried out.

In the foregoing embodiments, the tenant ID is stored in the license information storage unit 232. However, when uniqueness of the machine serial ID over the tenant is assured, it is not necessary to store the tenant ID in the license information storage unit 232. In such a case, the association between the service ID and the tenant ID may be identified by using the machine serial ID.

Further, the service providing device 20 may be implemented by a plurality of computers. In other words, the processes performed by the service providing device 20 according to the above embodiment may be distributed over the plurality of computers.

Figure 14:
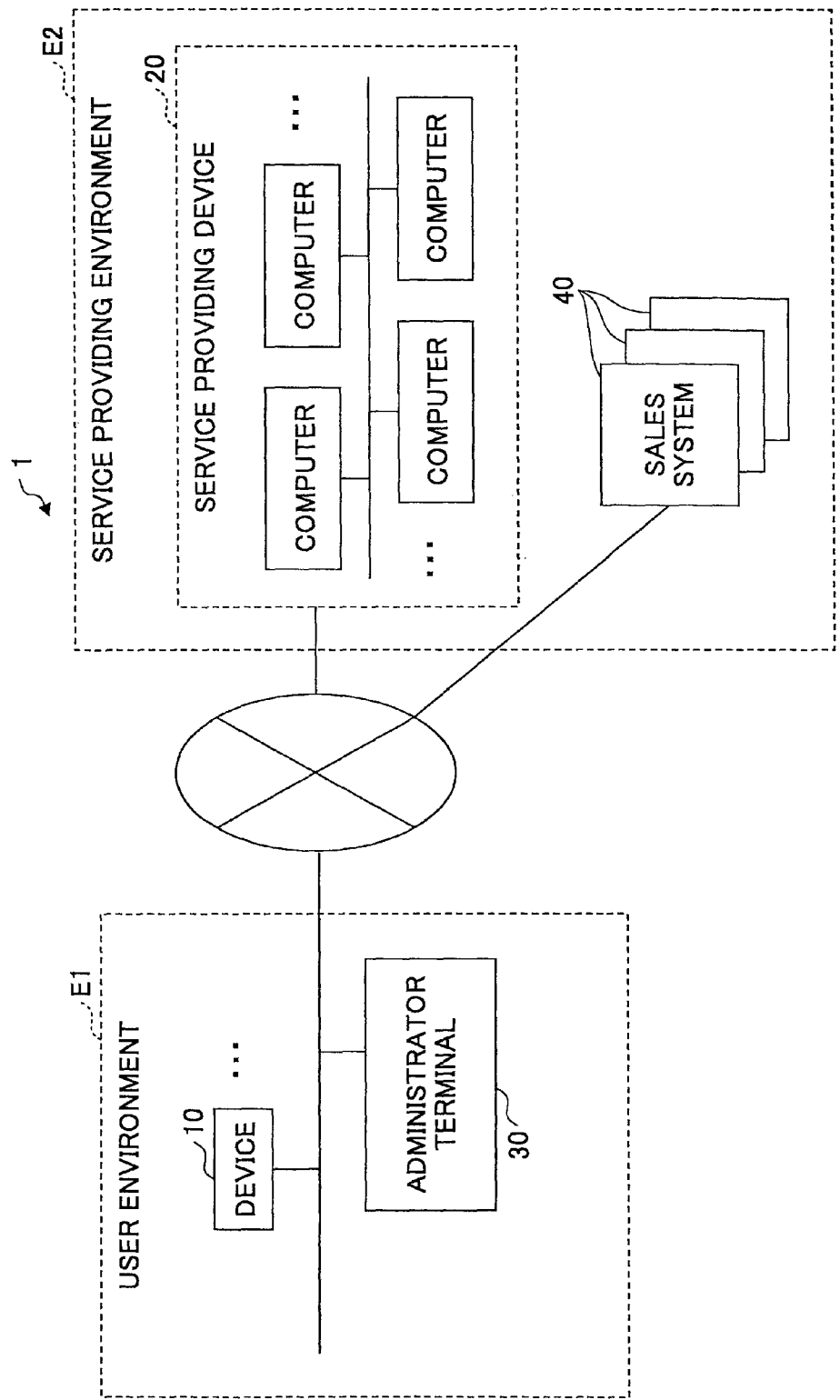
FIG. 14 is a diagram showing the configuration of a service providing device implemented by a plurality of computers.

FIG. 14 is a diagram showing the configuration of the service providing device implemented by the plurality of computers. As shown in FIG. 14, the service providing device 20 in the service providing environment E2 is implemented by the plurality of computers. Specifically, in the example shown in FIG. 14, the service providing device 20 is implemented by four or more computers. Alternatively, the service providing device 20 may be implemented by three or less computers.

In the foregoing embodiments, the service providing device 20 is an example of an information management device in the information management system. The device communication unit 225 is an example of a first receiving unit and a second receiving unit. The device information storage unit 233 is an example of a first storage unit. The license information storage unit 232 is an example of a second storage unit. The license management unit 223 is an example of a registering unit. The tenant ID is an example of organization identification information to identify an organization. The machine serial ID is an example of device identification information to identify a device. The license ID is an example of license identification information to identify a license.

As described in the foregoing, the management of the states of use of the services (licenses) on an organization-by-organization basis can be carried out.

The information management device according to the invention is not limited to the above embodiments and various variations and modifications may be made without departing from the scope of the invention.

The present application is based on and claims the benefit of priority of Japanese Patent Application No. 2012-245094, filed on Nov. 7, 2012, and Japanese Patent Application No. 2013-220765, filed on Oct. 24, 2013, the entire content of which are hereby incorporated by reference.

The invention claimed is:

1. An information management device, comprising:
a memory; and
a processor coupled to the memory and configured to execute a process including
receiving a device registration request from a device via a network, the device registration request including organization identification information to identify an organization and device identification information to identify the device in the organization;
storing in a first storage portion of the memory the organization identification information and the device identification information which are obtained from the received device registration request and associated with each other;
receiving a usability determination request from the device via the network, the usability determination request including the device identification information and license identification information to identify a license for using a predetermined service;
determining whether the license identified by the license identification information included in the received usability determination request is usable;
in response to a determination that the license is usable, receiving a license use start request from the device via the network, the license use start request including the license identification information and the device identification information; and
storing in a second storage portion of the memory the license identification information and the device identification information which are obtained from the received license use start request and associated with each other.

2. The information management device according to claim 1, wherein the process further includes:
generating the license identification information in response to receiving information related to the license, and
registering in the second storage portion the license identification information and the information related to the license, which are associated with each other,
wherein the registering includes storing in the second storage portion the device identification information associated with the received license identification information stored in the second storage portion.

3. The information management device according to claim 2, wherein the registering further includes:
   in response to receiving the information related to the license and the organization identification information, registering in the second storage portion the license identification information, the organization identification information, and the information related to the license which are associated together,
   the receiving the license use start request includes receiving from the device via the network the license identification information, the device identification information, and the organization identification information, and
   when the license identification information and the organization identification information are stored in the second storage portion, the storing in the second storage portion includes storing the device identification information that is associated with the license identification information stored in the second storage portion.

4. An information management system comprising:
   a device in an organization; and
   the information management device according to claim 1, the information management device being connected to the device via the network,
   wherein the receiving the device registration request includes receiving the organization identification information and the device identification information from the device via the network,
   the receiving the license use start request includes receiving the license identification information and the device identification information from the device via the network, and
   the license identification information and the device identification information are associated with each other and stored in the second storage portion.

5. An information management system including one or more computers, the information management system comprising:
   a memory; and
   a processor coupled to the memory and configured to execute a process including
   receiving a device registration request from a device via a network, the device registration request including organization identification information to identify an organization and device identification information to identify the device in the organization;
   storing in a first storage portion of the memory the organization identification information and the device identification information which are obtained from the received device registration request and associated with each other;
   receiving a usability determination request from the device via the network, the usability determination request including the device identification information and license identification information to identify a license for using a predetermined service;
   determining whether the license identified by the license identification information included in the received usability determination request is usable;
   in response to a determination that the license is usable, receiving a license use start request from the device via the network, the license use start request including the license identification information and the device identification information; and
   storing in a second storage portion of the memory the license identification information and the received the device identification information which are obtained from the received license use start request and associated with each other.

6. An information management method for performance of a process executed by an information management device including a memory and a processor coupled to the memory, the process comprising:
   receiving, by the processor, a device registration request from a device via a network, the device registration request including organization identification information to identify an organization and device identification information to identify a device in the organization;
   storing, by the processor, in a first storage portion of the memory the organization identification information and the device identification information which are obtained from the received device registration request and associated with each other;
   receiving, by the processor, a usability determination request from the device via the network, the usability determination request including the device identification information and license identification information to identify a license for using a predetermined service;
   determining, by the processor, whether the license identified by the license identification information included in the received usability determination request is usable;
   in response to a determination that the license is usable, receiving, by the processor, a license use start request from the device via the network, the license use start request including the license identification information and the device identification information; and
   storing, by the processor, in a second storage portion of the memory the license identification information and the device identification information which are associated with each other.

7. A non-transitory computer-readable recording medium storing a program which when executed by a processor causes the processor to execute a process, the process comprising:
   receiving a device registration request from a device via a network, the device registration request including organization identification information to identify an organization and device identification information to identify the device in the organization;
   storing in a first storage portion of a memory the organization identification information and the device identification information which are obtained from the received device registration request and associated with each other;
   receiving a usability determination request from the device via the network, the usability determination request including the device identification information and license identification information to identify a license for using a predetermined service;
   determining whether the license identified by the license identification information included in the received usability determination request is usable;
   in response to a determination that the license is usable, receiving a license use start request from the device via the network, the license use start request including the license identification information and the device identification information; and
   storing in a second storage portion of the memory the license identification information and the device identification information which are obtained from the received license use start request and associated with each other.

* * * * *